United States Patent
Abd Rahman

(10) Patent No.: US 11,453,815 B2
(45) Date of Patent: Sep. 27, 2022

(54) PUMPABLE GEOPOLYMER CEMENT

(71) Applicant: PETROLIAM NASIONAL BERHAD, Kuala Lumpur (MY)

(72) Inventor: Siti Humairah Abd Rahman, Kuala Lumpur (MY)

(73) Assignee: PETROLIAM NASIONAL BERHAD, Kuala Lumpur (MY)

( * ) Notice: Subject to any disclaimer, the term of this patent is extended or adjusted under 35 U.S.C. 154(b) by 0 days.

(21) Appl. No.: 16/967,452

(22) PCT Filed: Feb. 7, 2018

(86) PCT No.: PCT/MY2018/050004
§ 371 (c)(1),
(2) Date: Aug. 5, 2020

(87) PCT Pub. No.: WO2019/156547
PCT Pub. Date: Aug. 15, 2019

(65) Prior Publication Data
US 2021/0087457 A1    Mar. 25, 2021

(51) Int. Cl.
*C09K 8/48* (2006.01)
*C04B 12/00* (2006.01)
(Continued)

(52) U.S. Cl.
CPC .............. *C09K 8/48* (2013.01); *C04B 12/005* (2013.01); *C04B 22/062* (2013.01); *C04B 28/26* (2013.01);
(Continued)

(58) Field of Classification Search
CPC ....... C09K 8/48; C04B 12/005; C04B 22/062; C04B 28/26; C04B 40/0032; E21B 33/14
See application file for complete search history.

(56) References Cited

U.S. PATENT DOCUMENTS 5,244,726 A * 9/1993 Laney ................... C04B 28/006
428/312.6
7,794,537 B2    9/2010 Barlet-Gouedard et al.
(Continued)

FOREIGN PATENT DOCUMENTS

CN    105778875 A    7/2016
EP    2 407 524 A1   1/2012
(Continued)

OTHER PUBLICATIONS

International Search Report for PCT International Application No. PCT/MY2018/050004, dated May 17, 2018.
(Continued)

*Primary Examiner* — Crystal J. Lee
(74) *Attorney, Agent, or Firm* — Troutman Pepper Hamilton Sanders LLP (Rochester)

(57) ABSTRACT

This invention relates to an adaptable Geopolymer cement composition for application in oil and gas wells having a wide range of downhole temperatures. The base Geopolymer cement composition has an acceptable rheology of below 200 cP and can be tailored by the inclusion of various chemicals to control properties such as thickening time over a wide range of temperatures and densities. The disclosed Geopolymer cement composition is pumpable, mixable and stable. The composition can also be adapted to have expandable and swellable properties.

19 Claims, 3 Drawing Sheets

(51) Int. Cl.
  *C04B 22/06*  (2006.01)
  *C04B 28/26*  (2006.01)
  *C04B 40/00*  (2006.01)
  *E21B 33/14*  (2006.01)
  *C04B 103/22* (2006.01)
  *C04B 103/50* (2006.01)

(52) U.S. Cl.
  CPC .......... *C04B 40/0032* (2013.01); *E21B 33/14* (2013.01); *C04B 2103/22* (2013.01); *C04B 2103/50* (2013.01)

(56) References Cited

U.S. PATENT DOCUMENTS

| | | |
|---|---|---|
| 9,394,202 B2 | 7/2016 | Porcherie et al. |
| 2008/0028995 A1 | 2/2008 | Barlet-Gouedard et al. |
| 2010/0018708 A1 | 1/2010 | Khan et al. |
| 2011/0073311 A1* | 3/2011 | Porcherie .............. C04B 28/006 166/305.1 |
| 2011/0284223 A1 | 11/2011 | Porcherie et al. |
| 2012/0260829 A1 | 10/2012 | Pershikova et al. |
| 2012/0318175 A1 | 12/2012 | Porcherie et al. |
| 2013/0284070 A1* | 10/2013 | Dubey .................. C04B 12/005 106/695 |
| 2014/0110114 A1 | 4/2014 | Daou et al. |
| 2017/0130116 A1 | 5/2017 | McDonald et al. |
| 2017/0334779 A1* | 11/2017 | Gong ..................... C04B 14/22 |

FOREIGN PATENT DOCUMENTS

| | | | |
|---|---|---|---|
| WO | 2008017414 A1 | 2/2008 | |
| WO | WO-2008017414 A1 * | 2/2008 | ........... C04B 28/006 |
| WO | 2011/131306 A1 | 10/2011 | |
| WO | 2015/153286 A1 | 10/2015 | |
| WO | 2017023158 A1 | 2/2017 | |

OTHER PUBLICATIONS

Written Opinion for PCT International Application No. PCT/MY2018/050004, dated May 17, 2018.

PCT International Preliminary Report on Patentability for corresponding Application No. PCT/MY2018/050004 (dated Aug. 11, 2020).

* cited by examiner

PUMPABLE GEOPOLYMER CEMENT

This application is a national stage application under 35 U.S.C. 371 of PCT/MY2018/050004, filed Feb. 7, 2018.

FIELD OF INVENTION

The present invention covers the pumpable geopolymer cement composition and its application as a well cement in a wide range of downhole condition and densities.

BACKGROUND

The listing or discussion of a prior-published document in this specification should not necessarily be taken as an acknowledgement that the document is part of the state of the art or is common general knowledge.

Oil and gas well cements are used to fill and seal the annulus between the casing string and the drilled hole. A casing string is a long section of connected oilfield pipe that is lowered into a wellbore and is then cemented into place by a cement column.

Oil and gas well cement is considerably different to the cement used in construction industry because it has to work in an environment with varied temperatures and pressures. Various types of Ordinary Portland Cement (OPC) are used in the oil industry and these types are classified according to the downhole temperature and pressure that they solidify at. However, OPC has weaknesses associated with strength development under HPHT conditions and this may significantly reduce the strength of the cement, which can lead to failure of the integrity of the cement. In addition, the use of OPC leads to significant amounts of carbon dioxide being released. Thus, there is a need for a more environmentally-friendly material that also overcomes the drawbacks of OPC.

A potential alternative to OPC is to find a suitable geopolymer cement. Geopolymer cements are a low calcium, alkali-activated aluminosilicate cement which is obtained through geopolymerization (i.e. the reaction of aluminosilicates with an aqueous alkaline solution to provide a new class of inorganic binder). Test experiments have indicated that fly ash based geopolymer cement has excellent compressive strength and good acid resistance at atmospheric pressure and temperature. However, the geopolymer cements developed so far do not show a useful rheological properties that would allow it to be pumpable, nor do these materials provide a base formulation that can be readily manipulated to accommodate accommodate various well conditions. Thus, there remains a need for new and improved geopolymer cements that can solve some or all of these problems.

SUMMARY OF INVENTION

In a first aspect of the invention, there is provided a pumpable geopolymer cement composition comprising:
an aluminosilicate source material;
an alkaline solution comprising a carrier fluid, an alkaline activator material and a silicate material, wherein, the weight:weight ratio of the alkaline solution:aluminosilicate source material is from 0.1 to 2:1, and the weight:weight ratio of the silicate material:alkaline solution is from 0.15 to 1:1 (e.g. from 0.25 to 0.4:1).

In embodiments of the first aspect of the invention:

(a) the aluminosilicate source material may be fly ash type F, optionally wherein the fly ash type F has a calcium content of less than 10 wt %;

(b) the alkaline solution may comprise an alkaline activator material at a concentration of from 8 M to 12 M;

(c) the alkaline activator material may be sodium hydroxide and/or potassium hydroxide;

(e) the silicate may be selected from a sodium silicate;

(f) the composition may have a specific gravity of from 1.40 g/cm$^3$ to 1.91 g/cm$^3$;

(g) the composition may further comprise a weighting agent selected from one or more of the group consisting of barium sulfate, iron oxide, manganese tetroxide, where the weighting agent is present in an amount of from 30 to 75 wt % (e.g. 55 to 65 wt %) relative to the total weight of aluminosilicate source material in the composition (in certain embodiments, when a weighting agent is used, the composition may have a specific gravity of from 1.92 g/cm$^3$ to 2.99 g/cm$^3$);

(i) the composition may further comprise a lightweight material selected from one or more of the group consisting of silica-alumina microspheres, cenosphere, sodium-calcium-borosilicate in an amount of from 50 to 100 wt % relative to the total weight of aluminosilicate source material in the composition (in certain embodiments, when a lightweight material is used, the composition may have a specific gravity of from 1.21 g/cm$^3$ to 1.55 g/cm$^3$);

(j) the composition may further comprise one or more of a defoamer (e.g. a polydimethylsilicone), a fluid loss controller (e.g. hydroxyethylcellulose and/or 2-acrylamido-2-methylpropane sulfonic acid) and a dispersant (e.g. a polyethylene sulfonate), where each, when present, is provided in a concentration of from 0.001 kg/L to 0.3 kg/L relative to the total volume of the composition;

(k) the composition may further comprise a retarder material at a concentration of from 0.001 kg/L to 0.3 kg/L relative to the total volume of the composition (e.g. the retarder material may be lignosulfonate);

(l) the composition may further comprises a retarder material in an amount of from 5 to 60 wt % relative to the total weight of aluminosilicate source material in the composition. (e.g. the retarder material may be a sugar or a sugar-substitute material);

(m) the composition may further comprise a fast set material in an amount of from 25 to 45 wt % relative to the total weight of aluminosilicate source material in the composition, optionally wherein the composition may further comprise ground blast furnace slag;

(n) the composition may further comprise an expanding material in an amount of from 2 to 10 wt % relative to the total weight of aluminosilicate source material in the composition, optionally wherein the expanding material provides the geopolymer cement composition with a linear expansion of from 0.01% to 2.5% (e.g. the expanding material may be magnesium oxide);

(o) the composition may further comprise a swellable material in an amount of from 10 to 60 wt % relative to the total weight of aluminosilicate source material in the composition, optionally wherein the swellable material provides the geopolymer cement composition with a linear expansion of from 0.1% to 2% (e.g. the swellable material is butyl polystyrene).

In a second aspect of the invention, there is provided a method of forming a pumpable geopolymer cement formulation comprising the steps of:

(a) mixing a carrier fluid with an alkaline activator material to form a mixture;

(b) adding a silicate material to the mixture of step (a) and mixing to form a mixture;

(c) adding an aluminosilicate material to the mixture of step (b) and mixing; and In embodiments of the second aspect of the invention, (i) the aluminosilicate source material may be fly ash type F, optionally wherein the fly ash type F has a calcium content of less than 10 wt %;

(ii) the alkaline activator material may be added in amount to the alkaline activator material to provide a concentration of from 8 M to 12 M;

(iii) the alkaline activator material may be sodium hydroxide or potassium hydroxide;

(iv) the silicate may be selected from a sodium silicate;

(v) one or more of a defoamer (e.g. polydimethylsilicone), a fluid loss controller (e.g. hydroxyethylcellulose and/or 2-acrylamido-2-methylpropane sulfonic acid) and a dispersant (e.g. polyethylene sulfonate) may be added and mixed into the mixture of step (a) or step (b) and the resulting mixture is then used in the subsequent step, where each of the defoamer, fluid loss controller and dispersant, when present, is provided in a concentration of from 0.001 kg/L to 0.1 kg/L relative to the total volume of the composition; and/or a retarder material is added and mixed into the mixture of step (a) or step (b) of the method described herein and the resulting mixture is then used in the subsequent step, where the retarder material is:

(I) provided in a concentration of from 0.001 kg/L to 0.3 kg/L relative to the total volume of the composition, optionally wherein the retarder material is lignosulfonate; or (II) provided in an amount of from 5 to 60 wt % relative to the total weight of aluminosilicate source material in the composition, optionally wherein the retarder material is a sugar or a sugar-substitute material;

(vi) the mixing may be conducted in line with the API RP10B-2 mixing procedure.

DRAWINGS

DESCRIPTION

Figure 1:
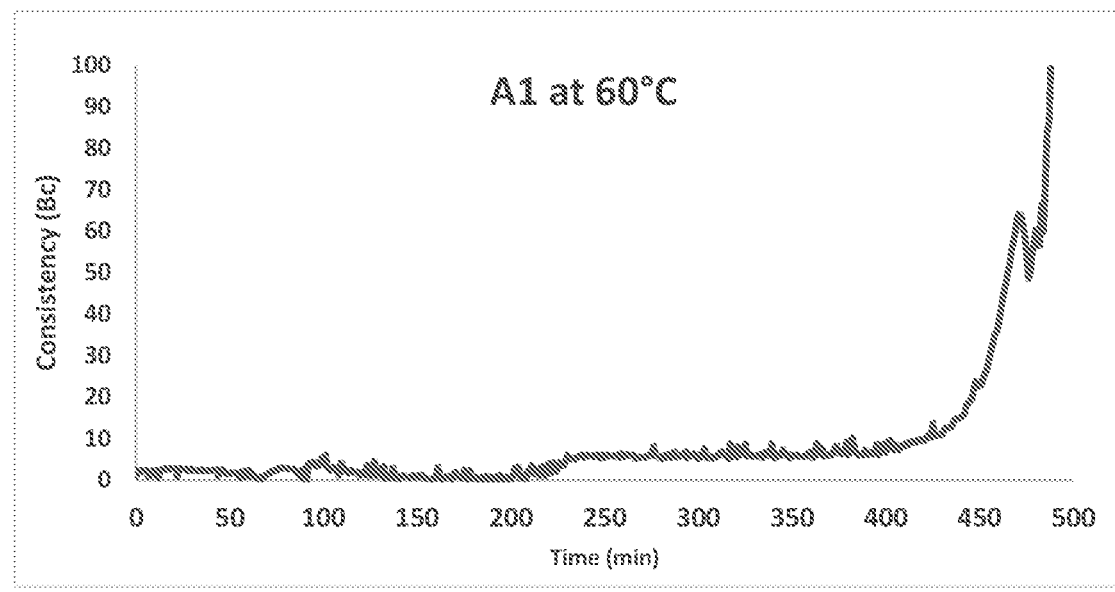
FIGS. 1 to 5 depict the thickening times of samples A1 to A5, respectively as measured using Bearden units.

It has been surprisingly found that a specific combination of an aluminosilicate material and an alkaline solution in controlled ratios can provide a suitable geopolymer cement base solution that is easily modified to suit a broad range of down-well conditions, while remaining pumpable. Thus, there is provided a pumpable geopolymer cement composition comprising: an aluminosilicate source material;

an alkaline solution comprising a carrier fluid, an alkaline activator material and a silicate material, wherein, the weight:weight ratio of the alkaline solution:aluminosilicate source material is from 0.1 to 2:1, and the weight:weight ratio of the silicate material:alkaline solution is from 0.15 to 1:1 (e.g. 0.25 to 0.4:1).

In embodiments herein, the word "comprising" may be interpreted as requiring the features mentioned, but not limiting the presence of other features. Alternatively, the word "comprising" may also relate to the situation where only the components/features listed are intended to be present (e.g. the word "comprising" may be replaced by the phrases "consists of" or "consists essentially of"). It is explicitly contemplated that both the broader and narrower interpretations can be applied to all aspects and embodiments of the present invention. In other words, the word "comprising" and synonyms thereof may be replaced by the phrase "consisting of" or the phrase "consists essentially of" or synonyms thereof and vice versa.

When used herein "pumpable" as it applies to the geopolymer cement composition means that the composition once formed has a viscosity less than or equal to 300 centipoise (cP) (e.g. less than or equal to 250 cP, such as less than or equal to 200 cP) until it reaches the targeted top of the cement column in the annulus within the desired pumping time.

The aluminosilicate source may be selected from ASTM Class F Fly Ash with a calcium component of less than 10% by weight. When used herein, the term "carrier fluid" means fresh water, a brine solution or a combination of both.

The alkaline activator material may be sodium hydroxide, potassium hydroxide or a combination of both, with the molarity being from 8 molar to 12 molar to ensure the pumpability of geopolymer cement. The optimum molarity for better mixability of the geopolymer cement composition is 8 molar. This is because the viscosity of the resulting geopolymer cement composition increases when the molarity of the alkaline material is increased, which may affect the mixability and stability of the pumpable geopolymer cement composition.

The other essential component of the geopolymer cement composition is a silicate. A suitable class of silicate that may be mentioned herein are the sodium silicates, which are compounds with the formula $(Na_2SiO_2)_nO$. A well-known member of this series is sodium metasilicate, $Na_2SiO_3$. It is noted that the weight:weight ratio of the silicate material:alkaline solution is from 0.15 to 1:1 (e.g. from 0.25 to 0.4:1 or any combination of said numbers, such as from 0.15 to 0.25:1, from 0.25 to 1:1, from 0.15 to 0.4:1, or from 0.4. to 1:1). It is noted that a lower ratio of silicate results in too low a compressive strength, while a higher ratio does not further improve the compressive strength of the geopolymer cement.

The base geopolymer composition comprising the aluminosilicate and alkaline solution (which in turn comprises a carrier fluid, an alkaline activator material and a silicate material) may be provided as a slurry having a specific gravity of suspension of from between 1.40 g/cm$^3$ (12.5 lb/gal) to 1.91 g/cm$^3$ (15.9 lb/gal). This specific gravity may be increased or decreased by the addition of specific additives.

To increase the specific gravity of the slurry suspension, a heavy weight material (e.g. a weighting agent, such as barium sulfate, iron oxide, manganese tetraoxide or combinations thereof) may be blended with the aluminosilicate source material at a concentration of from 55% to 65%, relative to the total weight of aluminosilicate source material in the composition. The use of such a concentration of these materials may result in a more dense composition, having a specific gravity of suspension of from 1.92 g/cm3 (16 lb/gal) to 2.99 g/cm3 (25 lb/gal).

To decrease the specific gravity of the slurry suspension a light weight material (e.g. silica-alumina microspheres, cenosphere, sodium-calcium-borosilicate and the like) may be blended with the aluminosilicate source material at a ratio (lightweight material:aluminosilicate source material) of from 0.5:1 to 1:1. The use of such an amount of these materials may result in a less dense composition, having a specific gravity of suspension of from 1.21 g/cm3 (10 lb/gal) to 1.55 g/cm3 (12.9 lb/gal).

One of the most important properties of a well cement is the ability for it to remain pumpable at any selected wellbore circulating temperature. One of the ways to accomplish this is to add a retarding agent, or retarding material, to the composition, which acts to control the hardening time or the setting/thickening time of the composition. The retarding material may be added in any suitable amount to the composition described above. For example, the retarding material be added to the composition at a concentration of from 0.001 kg/L to 0.3 kg/L relative to the total volume of the composition, or it may be added in an amount of from 5 to 60 wt % relative to the total weight of aluminosilicate source material in the composition.

It will be appreciated that specific retarding materials may be more suited to certain downhole temperatures. For example, the retarding material lignosulfonate may be particularly suited to use (e.g. at a concentration of from 0.001 kg/L to 0.3 kg/L relative to the total volume of the composition) at a downhole temperature of from 30 to 85° C. When the downhole temperature is from 85 to 250° C., the retarding material may be selected from a sugar or a sugar-substitute material (e.g. in an amount of from 5 to 60 wt % relative to the total weight of aluminosilicate source material in the composition). A sugar or sugar substitute retarder is able to increase the hardening time of the geopolymer cement for more than 17 hours at 150° C.

Suitable sugar materials that may be mentioned herein include monosaccharides (e.g. glucose, dextrose, fructose, and galactose), disaccharides (e.g. sucrose, fructose, maltose, and lactose) and oligosaccharides. Suitable sugar-substitute materials include natural sugar substitute materials (e.g. sugar alcohols, stevia and mogrosides) as well as artificial sweeteners. Suitable sugar alcohols include arabitol, erythritol, glycerol, hydrogenated starch hydrolysates, isomalt, lactitol, maltitol, mannitol, sorbitol and xylitol. Suitable artificial sweeteners include acesulfame potassium, advantame, alitame, salts of aspartame, salts of aspartame-acesulfame, sodium cyclamate, dulcin, glucin, neohesperidin dihydrochalcone, neotame, P-4000, saccharin and sucralose.

The thickening time test was performed as per ISO 10426-2/API RP-10B2 Recommended practice for testing well cement using High Pressure High Temperature (HPHT) Consistometer. The hardening time of cement was measured by the unit of Berden consistency (Bc), where cement is considered hardened or un-pumpable at 100 Bc. The material is considered to be unpumpable and to have thickened at 70 Bc.

In the event of lower temperature below than 40° C., a fast set material (e.g. ground blast furnace slag (GBFS)) may be added as a blend together with the aluminosilicate material (e.g. fly ash) at a concentration of from 25% to 45% by weight of the aluminosilicate material to control the setting time and improve strength. It was found that the higher the amount of GBFS added, the shorter the hardening time of Geopolymer cement. Thus, the lower the downhole temperature, the higher the amount of GBFS needed to achieve setting.

To control the viscosity of the geopolymer cement composition, a dispersant from the polyethylene sulphonate group may be added at concentration of from 0.001 kg/L to 0.15 kg/L relative to the total volume of the composition. When used in this concentration, this material may provide a viscosity of from 5 cP to 200 cP in the geopolymer cement composition used here.

A defoamer (e.g. polydimethylsilicone) may be added to control the presence of foam during the mixing/preparation of the geopolymer cement composition. When a defoamer is used, it may be added at a concentration of from 0.001 kg/L to 0.15 kg/L relative to the total volume of the composition.

To control the amount of fluid that escapes from the prepared cement slurries, a fluid loss controller may be added at a concentration of from 0.001 kg/L to 0.3 kg/L relative to the total volume of the composition. A suitable fluid loss controller may be hydroxyethylcellulose and/or 2-acrylamido-2-methyl-1-propanesulfonic acid (AMPS). When a fluid loss controller is used, the API fluid loss amount may be controlled to from 20 ml to 300 ml in a 30 min test time.

The geopolymer cement compositions described herein may be further combined with an expandable material (e.g. selected from the magnesium oxide group) at a concentration more than 1% (e.g. from 2 to 10 wt %) relative to the total weight of aluminosilicate source material in the composition to produce cement linear expansion more than 0.1%. The expansion of geopolymer cement is tested as per API RP 10B-5—Recommended Practice on Determination of Shrinkage and Expansion of Well Cement at Atmospheric Pressure using the expansion ring.

Additionally or alternatively, a swellable effect may be provided to the geopolymer cement by the addition of a suitable swellable material (e.g. butyl polystyrene), which may be added in an amount of from 10 to 60 wt % relative to the total weight of aluminosilicate source material in the composition. The swellable material may provide the geopolymer cement composition with a linear expansion of from 0.1% to 2% as measured using API RP 10-B5 using an expansion cell inside water and a hydrocarbon fluid.

To manufacture the base geopolymer cement formulation used herein, the following steps are conducted in sequence:
(a) mixing a carrier fluid with an alkaline activator material to form a mixture;
(b) adding a silicate material to the mixture of step (a) and mixing to form a mixture; and
(c) adding an aluminosilicate material to the mixture of step (b) and mixing.

Conveniently, the above process may be conducted according to the API RP10B-2 mixing procedure.

It is important that step (c) is conducted last so as to prevent the premature aging (i.e. reduced thickening time) of the composition. Such an effect would potentially make it harder to achieve the desired column height of cement in the bore. If the base geopolymer cement formulation needs to be adjusted to suit the particular downhole conditions of the bore, then all additional water-soluble solid components or liquids may be added as described hereinbefore in any technically sensible combination. Such additional components will be added to the mixture before any non-water-soluble solids are added (e.g. the aluminosilicate material, GBFS etc). For example, they may be added to the mixture of step (a) before step (b) is conducted or to the mixture of step (b) before step (c) is conducted. Alternatively, the additional components may be added as part of steps (a) and (b).

It will be appreciated that the geopolymer cement formulations discussed herein may be used in a method of fixing a casing into a wellbore, whereby there is an annulus between the casing and a wall of the wellbore, which method comprises pumping a geopolymer cement formulation through the casing and into the annulus up to a desired column height and allowing the cement to set, thereby fixing the casing into the wellbore. Reference to a wellbore in the context of the current invention may relate to an oil wellbore or a gas wellbore.

The invention will now be further illustrated with the following examples.

EXAMPLES

Example 1: 1.8 g/Cm³ (15 lb/Gal) Geopolymer Cement Tested at Different Downhole Circulating Temperatures Geopolymer cement slurries A1, A2, A3, A4 and A5 were prepared and tested in accordance with API/ISO 10426-2.

Slurry A1: 600 g of type F fly ash, 240 g of sodium hydroxide solution at 8 molarity, 60 g of Sodium silicate, 100 g of fresh water, 3 g of polyethylene sulphonate dispersant, 3 g of lignosulphonate retarder and 20 g of hydroxyethylcelulose fluid loss controller.

Slurry A2: 600 g of type F fly ash, 240 g of sodium hydroxide solution at 8 molarity, 60 g of sodium silicate, 100 g of fresh water, 3 g of polyethylene sulphonate dispersant, 50 g of lignosulphonate retarder and 35 g of hydroxyethylcelulose fluid loss controller.

Slurry A3: 600 g of type F fly ash, 240 g of sodium hydroxide solution at 8 molarity, 60 g of sodium silicate, 100 g of sea water, 3 g of polyethylene sulphonate dispersant, 100 g of monosaccaride retarder corresponded to 17% by weight of Fly Ash (BWOFA) and 35 g of hydroxyethylcelulose fluid loss controller.

Slurry A4: 600 g of type F fly ash, 240 g of sodium hydroxide solution at 8 molarity, 60 g of sodium silicate, 100 g of sea water, 3 g of polyethylene sulphonate dispersant, 200 g of monosaccaride retarder corresponded to 33% by weight of Fly Ash (BWOFA) and 90 g of hydroxyethylcelulose fluid loss controller.

Slurry A5: 600 g of type F fly ash, 240 g of sodium hydroxide solution at 8 molarity, 60 g of sodium silicate, 100 g of sea water, 3 g of polyethylene sulphonate dispersant, 260 g of monosaccaride retarder corresponded to 43% by weight of Fly Ash (BWOFA) and 110 g of hydroxyethylcelulose fluid loss controller.

Table 1 shows the properties of Geopolymer cement when tested at three different Bottom Hole Circulating Temperature (BHCT).

The slurries above were manufactured by mixing NaOH and water together, then the other materials, excluding the fly ash were added and mixed together, then fly ash was added.

Figure 2:
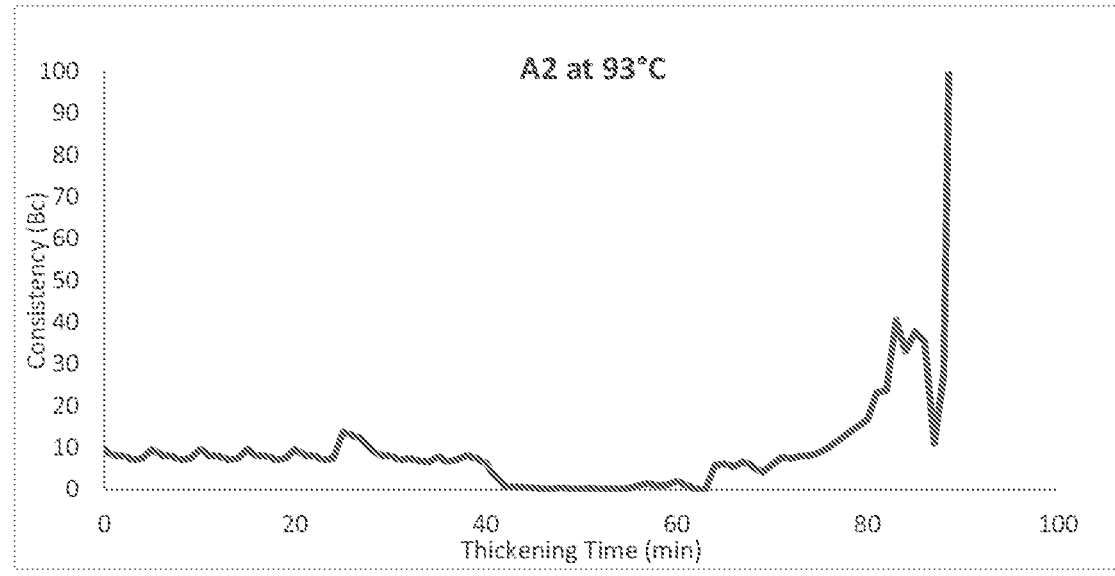
Figure 3:
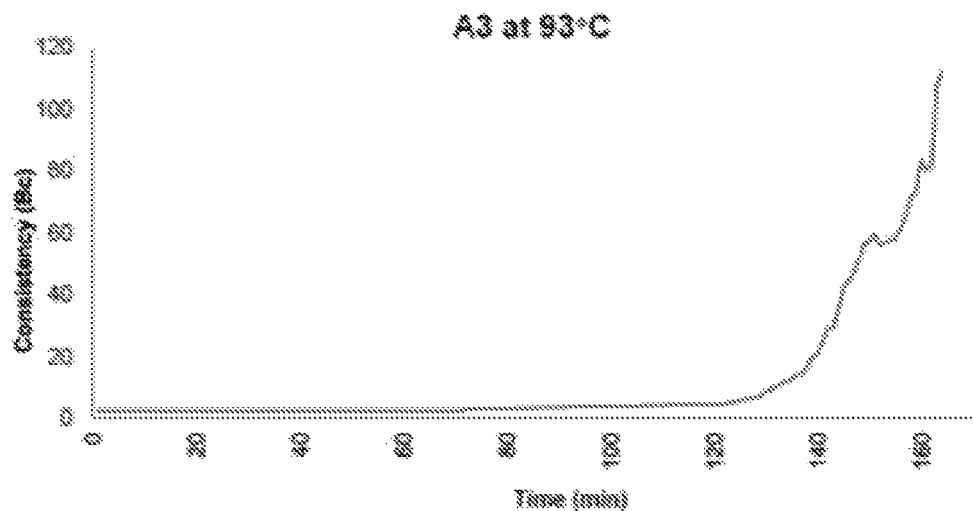
Figure 4:
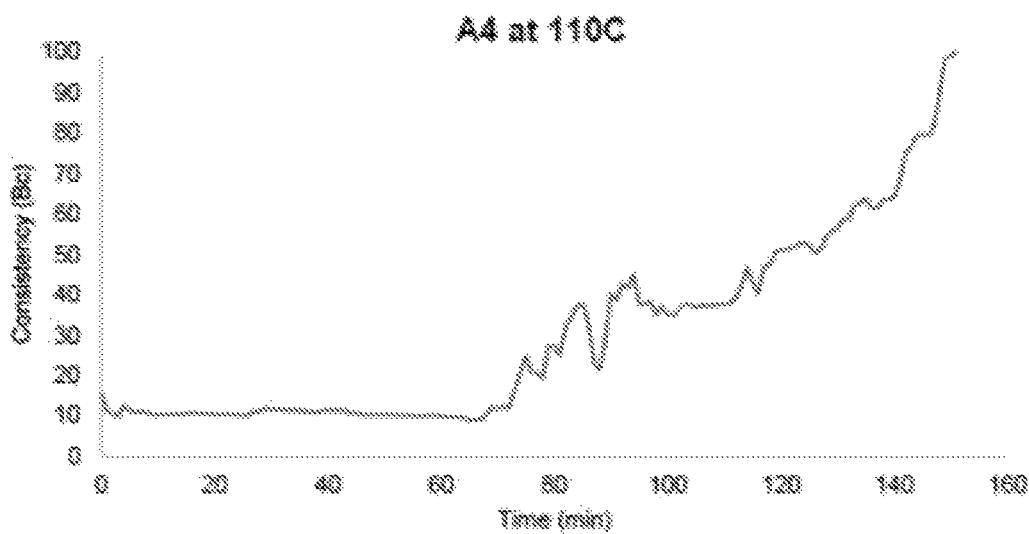
Figure 5:
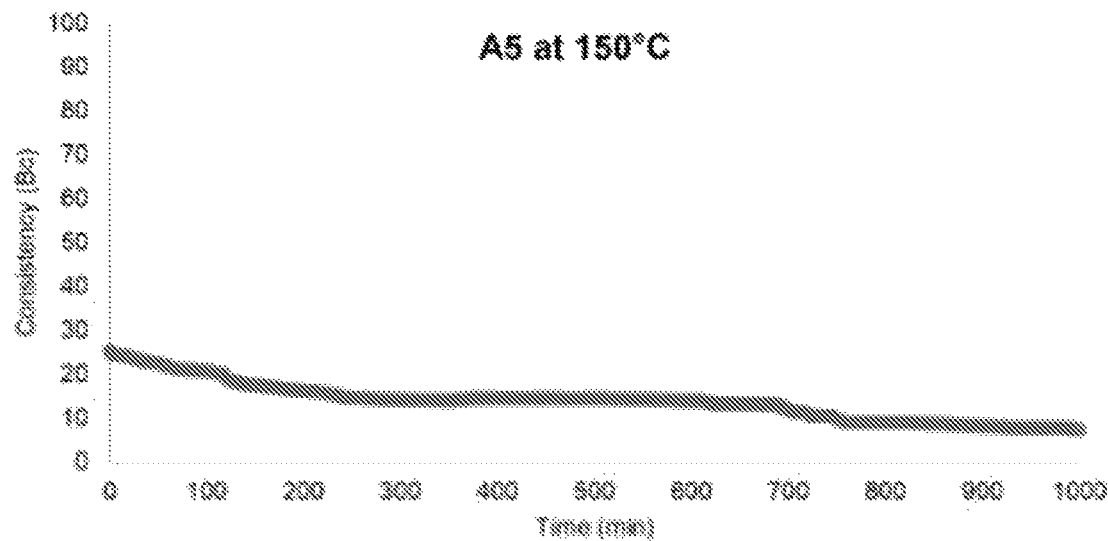
Figure 6:
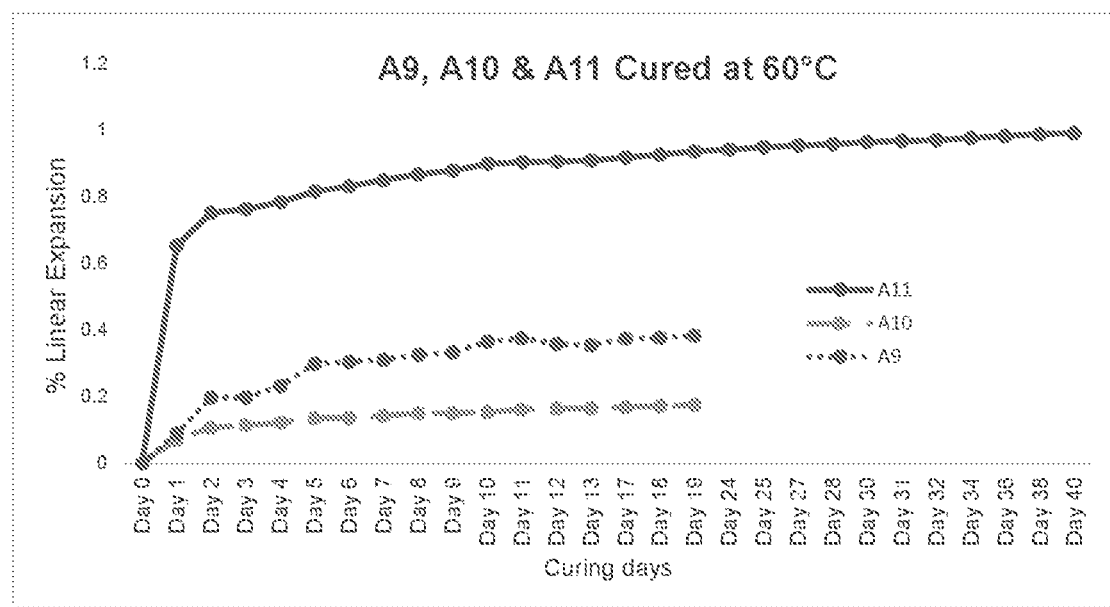
FIG. 6 depicts the linear expansion of samples A9 to A11 according to the current invention.

Table 1 shows the properties of these Geopolymer cement slurries when tested at four different Bottom Hole Circulating Temperatures (BHCT; 60° C., 93° C., 110° C. and 150° C.), as well as the effect of a retarder on thickening time. FIGS. 1 to 5 depict the thickening time of formulations A1 to A5 over a period of time at the selected BHTCs, using Bearden units of consistency.

TABLE 1

|  | A1 | A2 | A3 | A4 | A5 |
| --- | --- | --- | --- | --- | --- |
| Temperature (° C.) | 60 | 93 | 93 | 110 | 150 |
| Lignosulphonate retarder (g) | 3 | 50 | | | |
| Monosaccaride retarder (% BWOFA) | | | 17 | 33 | 45 |
| Rheological Properties after Mixing | | | | | |
| Plastic Viscosity (cP) | 32 | 29 | 41 | 96 | 84 |
| Yield Value (lbf/100 ft²) | 7 | 9 | 7 | 6 | 9 |
| 10-second gel [lbf/100 ft²] | 8 | 12 | 4 | 3 | 5 |
| 10-min gel [lbf/100 ft2] | 28 | 28 | 34 | 6 | 7 |
| Rheological Properties after Conditioning | | | | | |
| Plastic Viscosity (cP) | 37 | 50 | 71 | 57 | 87 |
| Yield Value (lbf/100 ft²) | 16 | 22 | 7 | 10 | 2 |
| 10-second gel [lbf/100 ft²] | 20 | 21 | 3 | 5 | 13 |
| 10-min gel [lbf/100 ft2] | 39 | 79 | 35 | 7 | 26 |
| Free Fluid (mL) | 0 | 0 | 0 | 0 | 0 |
| API Fluid Loss (ml/30 min) | 186 | 189 | 146 | 135 | 180 |
| Thickening Time (min) | 483 | 89 | 160 | 151 | >1020 |

The plastic viscosity of the Geopolymer cement formulations after mixing was between 29 to 96 cP, which shows good fluidity for all of cement slurries and was similar to the plastic viscosities obtained after conditioning, which were between 37-87 cP. The free fluid for all of the Geopolymer cement formulations was zero mL, which is suitable for application across the horizontal section in gas wells.

Slurry A3 shows that the retardation effect of a monosaccharide is higher than that displayed by the use of a lignosulphonate retarder in slurry A2 at 93° C. Indeed, the use of a sufficient quantity of a monosaccaride retarder was able to retard the setting of Geopolymer cement formulation A5 150° C. for more than 1020 min.

Example 2: Geopolymer Cement Tested at 30° C. Incorporating Ground Blast Furnace Slag (GBFS)

Geopolymer cement slurries A6, A7 and A8 were prepared and tested in accordance with API/ISO 10426-2. Table 2 lists the formulations of the slurries.

TABLE 2

| Ingredient | A6 | A7 | A8 |
| --- | --- | --- | --- |
| Type F fly ash | 450 g | 450 g | 260 g |
| GBFS | 150 g | 150 g | 140 g |
| Barium Sulfate | — | 200 g | — |
| Silica-alumina microspheres | — | — | 200 g |
| 8M NaOH (aq) | 240 g | 240 g | 240 g |
| Sodium silicate | 60 g | 60 g | 60 g |

For each of the formulations, the fly ash was blended in the solid state with GBFS (and with the barium sulfate or silica-alumina when used) before addition of this blended material to a solution containing sodium hydroxide and sodium silicate.

Table 3 details the effect of GBFS on thickening time and compressive strength of the geopolymer cement at 30° C. and 1000 psi.

TABLE 3

|  | A6 | A7 | A8 |
|---|---|---|---|
| Density (g/cm3) | 1.8 | 2.04 | 1.35 |
| GBFS (% BWOFA) | 33 | 33 | 54 |
| Thickening Time (min) | 1175 | 1345 | 360 |
| 24 hours Compressive Strength (psi) | 300 | 1690 | 2834 |

The addition of GBFS into the aluminosilicate blend can help to accelerate the setting time of the Geopolymer cement formulation as shown by slurry A8 in comparison to slurries A6 and A7. In other words, as the amount of GBFS added increases, the shorter the thickening time. In addition, increasing presence of GBFS also contributes to increased compressive strength after 24 hours following exposure to bottom hole conditions of 30° C. and 1000 psi.

Example 3: Geopolymer Expansion

Geopolymer cement slurries name as A9, A10 and A11 were prepared and tested in accordance with API/ISO 10426-5 at 60° C. Slurry A9 comprises: 400 g of type F fly ash blended with 20 g of magnesium oxide that was then added into a solution formed from mixing 444 g of an 8 M aqueous sodium hydroxide solution with 156 g of sodium silicate in 100 g of fresh water. Slurry A10 comprises: 600 g of type F fly ash blended with 30 g of magnesium oxide that was then added into a solution formed from mixing 240 g of an 8 M aqueous sodium hydroxide solution with 60 g of sodium silicate in 100 g of fresh water. Slurry A11 comprises: 600 g of type F fly ash blended with 150 g of a swellable material that comprises butyl polystyrene, the blended mixture was added into a solution formed from mixing 240 g of 8 M aqueous sodium hydroxide solution with a solution of 60 g of sodium silicate in 100 g of fresh water. Table 4 provides details of the linear expansion of the geopolymer cements tested at 60° C.

TABLE 4

|  | A9 | A10 | A11 |
|---|---|---|---|
| % Linear expansion | 0.38 after 19 days | 0.18 after 19 days | 0.99 after 40 days |

The percentage of linear expansion of A9 was 0.38% after 19 days curing at 60° C., while A10 only showed 0.18% over the same time period. The addition of a swellable material increased linear expansion to 0.99% in A11 after 40 days of curing. Addition of expandable material at higher concentration is required to increase the amount of expansion in Geopolymer cement.

The invention claimed is:

1. A pumpable geopolymer cement composition comprising:
an aluminosilicate source material;
an alkaline solution comprising a carrier fluid, an alkaline activator material and a silicate material, wherein, the weight:weight ratio of the alkaline solution:aluminosilicate source material is from 0.1 to 2:1, and the weight:weight ratio of the silicate material:alkaline solution is from 0.15 to 1:1,
wherein the composition further comprises a swellable material in an amount of from 10 to 60 wt % relative to the total weight of aluminosilicate source material in the composition.

2. The composition of claim 1, wherein the aluminosilicate source material is fly ash type F.

3. The composition of claim 1, wherein the alkaline solution comprises an alkaline activator material at a concentration of from 8 M to 12 M.

4. The composition of claim 1, wherein the alkaline activator material is selected from one or more of sodium hydroxide and potassium hydroxide.

5. The composition of claim 1, wherein the silicate material is a sodium silicate.

6. The composition of claim 1, wherein the composition has a specific gravity of from 1.40 $g/cm^3$ to 1.91 $g/cm^3$.

7. The composition of claim 1, wherein the composition further comprises a weighting agent selected from one or more of the group consisting of barium sulfate, iron oxide, and manganese tetroxide, where the weighting agent is present in an amount of from 30 to 75 wt % relative to the total weight of aluminosilicate source material in the composition.

8. The composition of claim 7, wherein the composition has a specific gravity of from 1.92 $g/cm^3$ to 2.99 $g/cm^3$.

9. The composition of claim 1, wherein the composition further comprises a lightweight material selected from one or more of the group consisting of silica-alumina microspheres, cenosphere, sodium-calcium-borosilicate in an amount of from 50 to 100 wt % relative to the total weight of aluminosilicate source material in the composition.

10. The composition of claim 9, wherein the composition has a specific gravity of from 1.21 $g/cm^3$ to 1.55 $g/cm^3$.

11. The composition of claim 1, wherein the composition further comprises one or more of a defoamer, a fluid loss controller and a dispersant, where each, when present, is provided in a concentration of from 0.001 kg/L to 0.3 kg/L relative to the total volume of the composition.

12. The composition of claim 1, wherein the composition further comprises a retarder material at a concentration of from 0.001 kg/L to 0.3 kg/L relative to the total volume of the composition.

13. The composition of claim 1, wherein the composition further comprises a retarder material in an amount of from 5 to 60 wt % relative to the total weight of aluminosilicate source material in the composition.

14. The composition of claim 13, wherein the retarder is a sugar or a sugar-substitute material.

15. The composition of claim 1, wherein the composition further comprises a fast set material in an amount of from 25 to 45 wt % relative to the total weight of aluminosilicate source material in the composition.

16. The composition of claim 1, wherein the composition further comprises an expanding material in an amount of from 2 to 10 wt % relative to the total weight of aluminosilicate source material in the composition.

17. A method of forming a pumpable geopolymer cement formulation comprising the steps of:
(a) mixing a carrier fluid with an alkaline activator material to form a first mixture;
(b) adding a silicate material to the first mixture of step (a) and mixing to form a second mixture; and
(c) adding an aluminosilicate material to the second mixture of step (b) and mixing,
wherein any one of steps (a) to (c) further comprises adding a swellable material in an amount of from 10 to 60 wt % relative to the total weight of aluminosilicate source material in the formulation.

18. The method of claim 17, wherein one or both of the following apply:
one or more of a defoamer, a fluid loss controller and a dispersant are added and mixed into the first mixture of step (a) or the second mixture of step (b) and the resulting first or second mixture is then used in the subsequent step, where each of the defoamer, fluid loss controller and dispersant, when present, is provided in a concentration of from 0.001 kg/L to 0.1 kg/L relative to the total volume of the composition; and
(ii) a retarder material is added and mixed into the first mixture of step (a) or second mixture of step (b) and the resulting first or second mixture is then used in the subsequent step, where the retarder material is:
(I) provided in a concentration of from 0.001 kg/L to 0.3 kg/L relative to the total volume of the composition, optionally wherein the retarder material is ligno-sulfonate; or
(II) provided in an amount of from 5 to 60 wt % relative to the total weight of aluminosilicate source material in the composition, optionally wherein the retarder material is a sugar or a sugar-substitute material.

19. The method of claim 17, wherein the mixing is conducted in line with the API RP10B-2 mixing procedure.

* * * * *

UNITED STATES PATENT AND TRADEMARK OFFICE
CERTIFICATE OF CORRECTION

| | | |
|---|---|---|
| PATENT NO. | : 11,453,815 B2 | |
| APPLICATION NO. | : 16/967452 | |
| DATED | : September 27, 2022 | |
| INVENTOR(S) | : Siti Humairah Abd Rahman | |

It is certified that error appears in the above-identified patent and that said Letters Patent is hereby corrected as shown below:

In the Claims

At Claim 18, Column 11, Line 5, please insert --(i)-- before "one or more of a defoamer".

Signed and Sealed this
Third Day of January, 2023

Katherine Kelly Vidal
*Director of the United States Patent and Trademark Office*